United States Patent
Yoshikawa et al.

(10) Patent No.: US 7,440,186 B2
(45) Date of Patent: Oct. 21, 2008

(54) SCREEN, A FRESNEL LENS SHEET USED FOR THE SCREEN, AND AN IMAGE DISPLAY APPARATUS USING THE SCREEN

(75) Inventors: Hiroki Yoshikawa, Hiratsuka (JP); Tetsu Ohishi, Hiratsuka (JP); Daisuke Imafuku, Fujisawa (JP); Koji Hirata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 525 days.

(21) Appl. No.: 11/281,819

(22) Filed: Nov. 18, 2005

(65) Prior Publication Data
US 2006/0132913 A1 Jun. 22, 2006

(30) Foreign Application Priority Data
Dec. 17, 2004 (JP) ............................. 2004-365259

(51) Int. Cl.
*G03B 21/56* (2006.01)
*G02B 3/08* (2006.01)
(52) U.S. Cl. ...................................... 359/460; 359/742
(58) Field of Classification Search ................ 359/457, 359/460, 742–743
See application file for complete search history.

(56) References Cited
U.S. PATENT DOCUMENTS

| | | | |
|---|---|---|---|
| 6,804,055 B2 * | 10/2004 | Peterson et al. | 359/457 |
| 7,088,507 B2 * | 8/2006 | Peterson | 359/449 |
| 7,245,429 B2 * | 7/2007 | Yoshikawa et al. | 359/460 |
| 2004/0212881 A1 * | 10/2004 | Peterson et al. | 359/457 |
| 2004/0246578 A1 * | 12/2004 | Shikama et al. | 359/457 |
| 2005/0046939 A1 * | 3/2005 | Yoshikawa et al. | 359/457 |
| 2005/0174636 A1 * | 8/2005 | Yoshikawa et al. | 359/457 |
| 2007/0146879 A1 * | 6/2007 | Yoshikawa et al. | 359/460 |

FOREIGN PATENT DOCUMENTS

| | | |
|---|---|---|
| JP | 2004-170862 | 6/2004 |
| WO | WO 02/27399 A1 | 4/2002 |

* cited by examiner

*Primary Examiner*—Christopher Mahoney
(74) *Attorney, Agent, or Firm*—Antonelli, Terry, Stout & Kraus, LLP.

(57) ABSTRACT

The present invention provides a technology suitable for shortening a depth of a image display apparatus while obtaining a picture of high quality. According to the invention, a total reflection prism portion is provided on a side of a Fresnel lens sheet toward a picture source. The total reflection prism portion reflects an incident light to a direction toward an optic axial center of the Fresnel lens sheet to have the same outgoing. On the other hand, a first refractive prism portion, by which light of a predetermined incident angle or less is refracted to outgo to a direction along an optical axis of the Fresnel lens sheet, and a second refractive prism portion, by which light reflected to the direction toward the optic axial center of the Fresnel lens sheet is changed to the direction along the optical axis.

13 Claims, 14 Drawing Sheets

SCREEN, A FRESNEL LENS SHEET USED FOR THE SCREEN, AND AN IMAGE DISPLAY APPARATUS USING THE SCREEN

INCORPORATION BY REFERENCE

The present application claims priority from Japanese application JP 2004-365259 filed on Dec. 17, 2004, the content of which is hereby incorporated by reference into this application.

BACKGROUND OF THE INVENTION (1) Field of the Invention

The present invention relates to an image display apparatus that enlarges and projects an image of a picture source to display the same on a transmissive screen, a screen and a Fresnel lens sheet both used in the image display apparatus.

(2) Description of the Related Art

A projection type image display apparatus (hereinafter, in some cases, referred to as "set") uses a projection lens, etc. to enlarge a picture displayed on a projection type Braun tube, a liquid crystal display apparatus, etc. as a small-sized picture source to project the same on a transmissive screen, thereby forming a picture on the transmissive screen.

Thinning (reduction of the set in depth dimension) is demanded of such image display apparatus in order to achieve lightening and reduction in cost and installation space. There is known the construction of a transmissive screen conformed to a thinned set and described in, for example, WO/02/27399 and JP-A-2004-170862.

SUMMARY OF THE INVENTION

Thinning (reduction in depth dimension) of a set can be made by making a projection lens a wide-angle one to shorten a distance of projection and further shifting an optic axial center of the projection lens downward from a center of a transmissive screen (for example, making an optic axial center of the projection lens in agreement with a center of a lower end of the transmissive screen).

In the case where, for example, a screen (an aspect ratio of 16:9) is sized to have a diagonal of 65 inches, a projection lens has a distance of projection of 500 mm, and a set has a depth of 350 mm in such construction, however, an incident angle of image light incident on left and right upper ends of a transmissive screen from the projection lens is as large as 65.2 degrees. FIG. 12 is a graph illustrating relationship between a ray incident angle onto a screen and reflection loss in a typical outgoing surface Fresnel lens sheet. It is found from FIG. 12 that when the ray incident angle is 65.2 degrees, the reflection loss of the screen is as large as 36%. When a image display apparatus is further thinned, the loss is sharply increased to cause a problem that left and right upper ends of a screen become dark.

WO/02/27399 discloses, as a transmissive screen conformed to thinning of a set, that refractive prisms and total reflection prisms are provided alternately on a light incident surface of a Fresnel lens sheet and a light outgoing surface of the sheet is made a flat surface. Since the construction described in WO/02/27399is one, in which refractive prisms are provided on a light incident surface of a Fresnel lens sheet, however, a decrease in efficiency is caused and an intermediate region image (a doughnut-shaped region on a screen), which is especially important as an image, become dark in some cases.

Also, with that construction, in which refractive prisms and total reflection prisms are provided on a Fresnel lens sheet, discontinuity of light is in some cases generated on boundary portions of the refractive prisms and the total reflection prisms due to a difference in transmissivity between the refractive prisms and the total reflection prisms. When discontinuity of light is generated, discontinuous portions are produced on a picture as viewed from the front, which makes a factor for degradation in image quality.

JP-A-2004-170862 discloses, as a transmissive screen conformed to thinning of a set, that only total reflection prisms are provided on a light incident surface of a Fresnel lens sheet and second prisms are provided on a light outgoing surface of the Fresnel lens sheet to lead an outgoing light of the total reflection prisms to a direction perpendicular to a surface of the Fresnel lens sheet. However, the construction described in JP-A-2004-170862 has a limit in a range of an available ray incident angle such that according to JP-A-2004-170862, in case of an incident angle of 35°, even with downward 10°, a bundle of rays of 20% becomes a stray light. Accordingly, the Fresnel lens sheet described in JP-A-2004-170862 is decreased in efficiency with a ray incident angle of at most 35° and an image becomes dark in some cases.

In this manner, with a transmissive screen conformed to thinning of a image display apparatus, it is an important problem to reduce the reflection loss of light on a light incident surface of the screen and to enhance light in efficiency to brighten a picture (in other words, to restrain reduction of a picture in brightness). Also, it is one of important problems to restrain discontinuity of light.

The invention has been thought of in view of the above-described problems and has its object to provide a technology suitable for shortening a depth of a image display apparatus while obtaining a picture of high image quality.

In order to attain the object, according to the invention, a total reflection prism portion is formed in that region on a side (a light incident surface) of a Fresnel lens sheet toward a picture source, on which light is incident at a predetermined incident angle (for example, around 36 degrees) or more, and a first refractive prism portion including a first refraction surface is formed on a picture seen side (a light outgoing surface). The total reflection prism portion includes incident surfaces, on which light is incident, and total reflection surfaces that reflect incident light from the incident surfaces to have the same outgoing toward the picture seen side. The total reflection prism portion includes a first total reflection prism potion that reflects at least light to a first direction substantially perpendicular to the Fresnel lens sheet to have the same outgoing, and a second total reflection prism portion that reflects the light to a second direction toward an optic axial center of the Fresnel lens sheet to have the same outgoing. Further, a second refractive prism portion including a second refractive surface is provided to refract light, which outgoes from the second total reflection prism portion to travel to the second direction, to the first direction to have the same outgoing.

The first refractive prism portion and the second refractive prism portion may be provided adjacent to each other, and a prism angle of at least one surface, which is different from the second refractive surface of the second refractive prism portion and disposed in a predetermined region, may be made substantially the same as a prism angle of the first refractive prism portion adjacent to the second refractive prism portion.

That region on a side of the Fresnel lens sheet toward a picture source, on which the light is incident at less than a predetermined incident angle, defines a flat portion, and the predetermined region is one opposed to a region including a boundary of the total reflection prism portion and the flat portion.

In order to attain the above-described object, according to the invention, a total reflection prism portion is formed in that region on a side (a light incident surface) of a Fresnel lens sheet toward a picture source, on which light is incident at a predetermined incident angle (for example, around 36 degrees) or more, and a first refractive prism portion is formed on a picture seen side (a light outgoing surface). The total reflection prism portion includes incident surfaces, on which light is incident, and total reflection surfaces that reflect an incident light from the incident surfaces to have the same outgoing toward the picture seen side. The total reflection prism portion includes a first total reflection prism portion that reflects light to a first direction substantially perpendicular to the Fresnel lens sheet to have the same outgoing, and a second total reflection prism portion that reflects light to a second direction toward an optic axial center of the Fresnel lens sheet to have the same outgoing. Further, a second refractive prism portion is provided to refract light, which outgoes from the second total reflection prism portion to the second direction, to the first direction to have the same outgoing. A third refractive prism portion is provided between the second refractive prism portion and the first refractive prism portion to include at least a surface having a prism angle of the second refractive prism portion and a surface having a prism angle of the first refractive prism portion.

That region on a side of the Fresnel lens sheet toward a picture source, on which the light is incident at less than a predetermined incident angle, may define a flat portion, and the third refractive prism portion may be provided in a region opposed to a region including a boundary of the total reflection prism portion and the flat portion.

In the case where a total reflection prism portion is formed on a side of a Fresnel lens sheet toward a picture source, and a first refractive prism portion is formed on a picture seen side of the Fresnel lens sheet as described above, a second refractive prism portion is provided on that opposed surface of the total reflection prism portion, which is used with a ray incident angle equal to or less than a predetermined angle. Thereby, a region, in which the total reflection prism portion is used, can be enlarged, and the total reflection prism portion at a connection to the first refractive prism portion and the first refractive prism portion can be made substantially equal to each other in transmissivity. Accordingly, it is possible to very favorably restrain a change in brightness, caused according to an angle of seeing.

A third refractive prism portion including at least a surface having a prism angle of the second refractive prism portion and a surface having a prism angle of the first refractive prism portion is provided between the second refractive prism portion and the first refractive prism portion. Thereby, even in the case where the total reflection prism portion on the side toward a picture source, and the first refractive prism portion on the picture seen side get out of position due to an error in manufacture, it is possible to decrease degradation in image quality.

In this manner, it is possible according to the invention to achieve thinning of a image display apparatus while obtaining a picture of high quality.

Other objects, features and advantages of the invention will become apparent from the following description of the embodiments of the invention taken in conjunction with the accompanying drawings.

DETAILED DESCRIPTION OF THE PREFERRED EMBODIMENT

Figure 1:
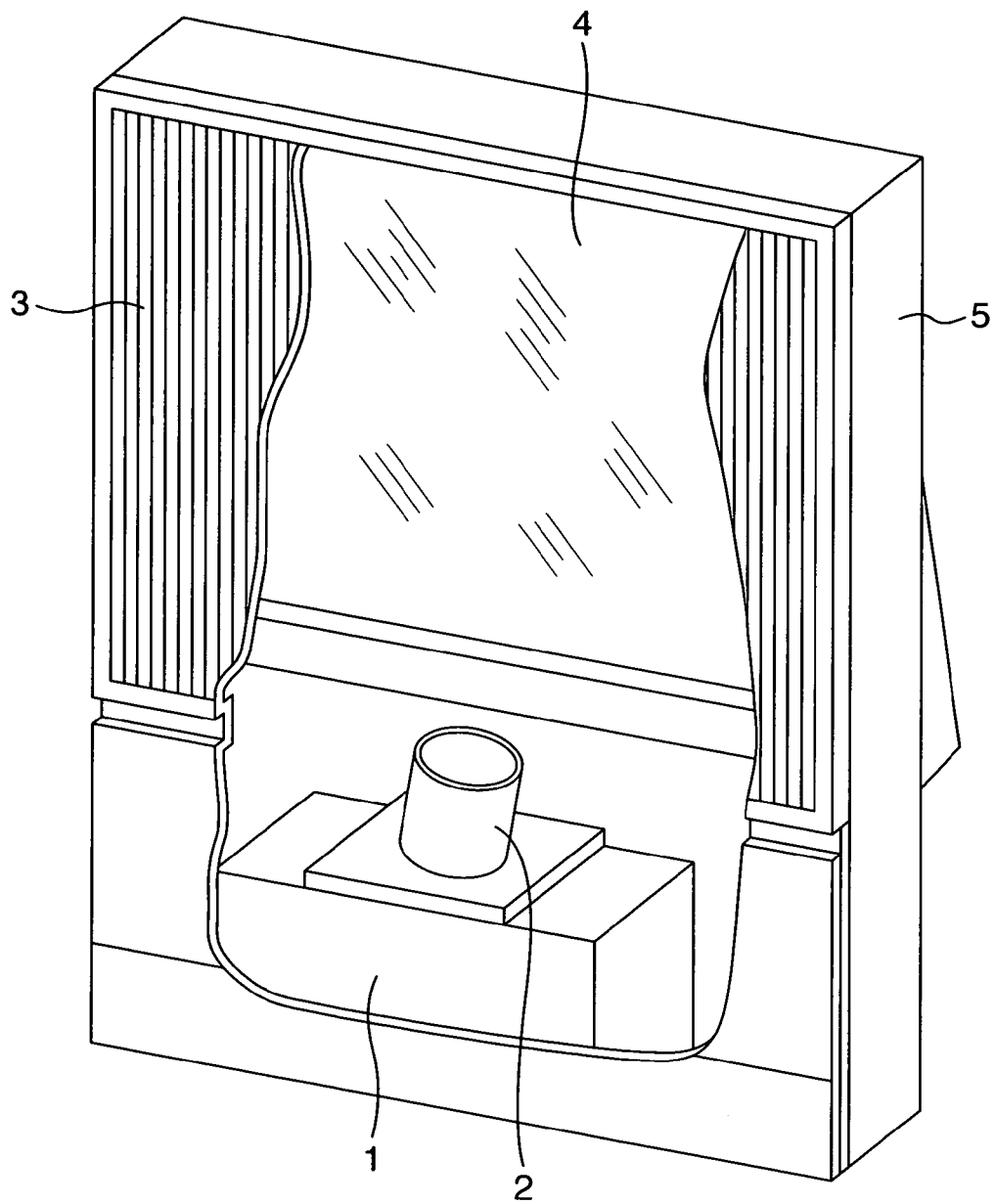
FIG. 1 is a partially sectioned perspective view of an embodiment of a image display apparatus according to the invention.

Embodiments of the invention will be described hereinafter with reference to the drawings. FIG. 1 is a partially sectioned perspective view of a image display apparatus according to the invention. A picture source 1 is structured by a projection type Braun tube, a reflection or transmissive liquid crystal panel, a picture modulation element such as a display element provided with a plurality of fine mirrors, and the like, and displays a small-sized picture. A projection lens 2 projects the picture on a transmissive screen 3. Since generally a distance of projection is long, a reflection mirror 4 is provided midway an optical path so as to reduce a depth of the image display apparatus. These elements are accommodated within a housing 5 and fixed in predetermined positions.

Figure 2:
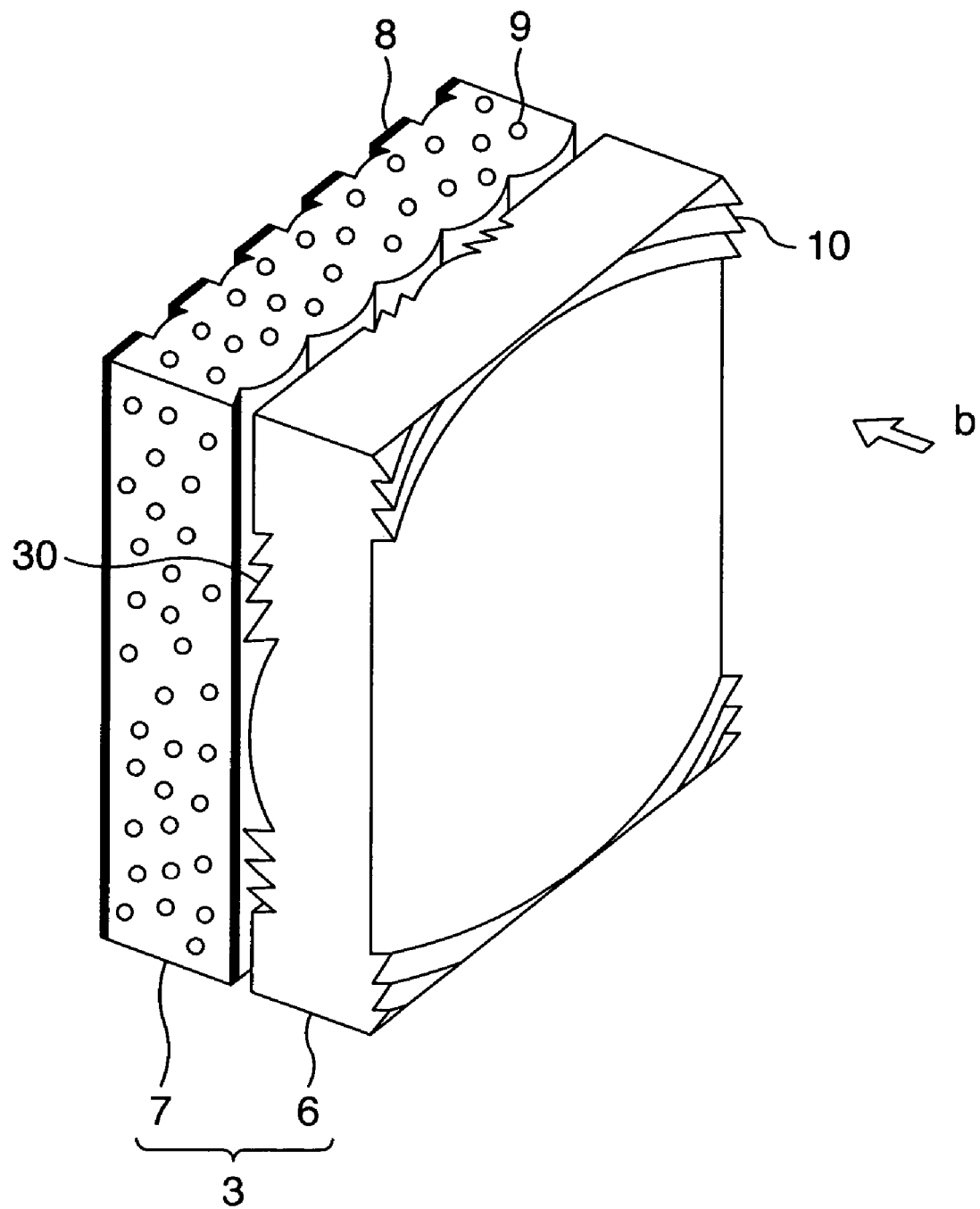
FIG. 2 is a schematic view showing the construction of a transmissive screen of the image display apparatus shown in FIG. 1.

FIG. 2 is a schematic view showing construction of the transmissive screen 3 according to an embodiment of the invention. An enlarged projection image light (not shown) projected in a direction indicated by an arrow b is changed by a Fresnel lens sheet 6 into substantially parallel light or a little inwardly directed light to be incident on a lenticular lens sheet 7. The lenticular lens sheet 7 is shaped such that a plurality of lenticular lenses of which longitudinal axes are in a vertical direction of a screen plane are arranged in a horizontal direction of the screen plane as shown in the figure, and serves to diffuse the image light in the horizontal direction of the screen plane. Black stripes 8 extending in the vertical direction of the screen plane are formed on an outgoing surface of the lenticular lens sheet 7 to absorb outdoor daylight incident from a screen outgoing side. A dispersing agent 9 is mixed in the lenticular lens sheet 7 to serve to diffuse the image light in the horizontal and vertical directions of the screen plane.

In the embodiment of the transmissive screen, according to the invention, shown in FIG. 2, a total reflection prism portion 10 is provided on a side of the Fresnel lens sheet 6 toward the picture source. The total reflection prism portion 10 includes a first total reflection prism portion and a second total reflection prism portion. The first total reflection prism portion is provided in a region, in which an incident angle of the enlarged projection image light projected in the direction of the arrow b to the Fresnel lens sheet 6 becomes around 46 degrees or more, in the case where a material forming the Fresnel lens sheet 6 has a refractive index of approximately 1.55. The first total reflection prism portion totally reflects incident rays of light after a first refractive phenomenon to cause the same to outgo to a first direction substantially perpendicular to the Fresnel lens sheet 6. The second total reflection prism portion is provided in a region, in which the incident angle is around 46 degrees to around 36 degrees. The second total reflection prism portion totally reflects incident rays of light after the first refractive phenomenon to cause the same to outgo to a second direction, which is directed toward an optic axial center of the Fresnel lens sheet 6 relative to the first direction.

On the other hand, a refractive prism portion 30 is provided on a picture seen side of the Fresnel lens sheet 6. The refractive prism portion 30 includes a first refractive prism portion, a second refractive prism portion, and a third refractive prism portion. The first refractive prism portion is provided in a region opposed to a region, in which the total reflection prism portion is not provided, and serves to outgo the image light as a light having a predetermined outgoing angle due to a second refractive phenomenon. The second refractive prism portion is provided in a region disposed on the picture seen side of the Fresnel lens sheet 6 and opposed to the second total reflection prism portion. The second refractive prism portion serves to cause rays of light, which outgo from the second total reflection prism portion to be directed in the second direction, to outgo as rays of light, which have a predetermined outgoing angle, due to a third refractive phenomenon. Further, the third refractive prism portion is provided in the vicinity of a border of the first refractive prism portion and the second refractive prism portion. The third refractive prism portion is structured to be able to simultaneously fulfill the functions of the first and second refractive prism portions.

Figure 3:
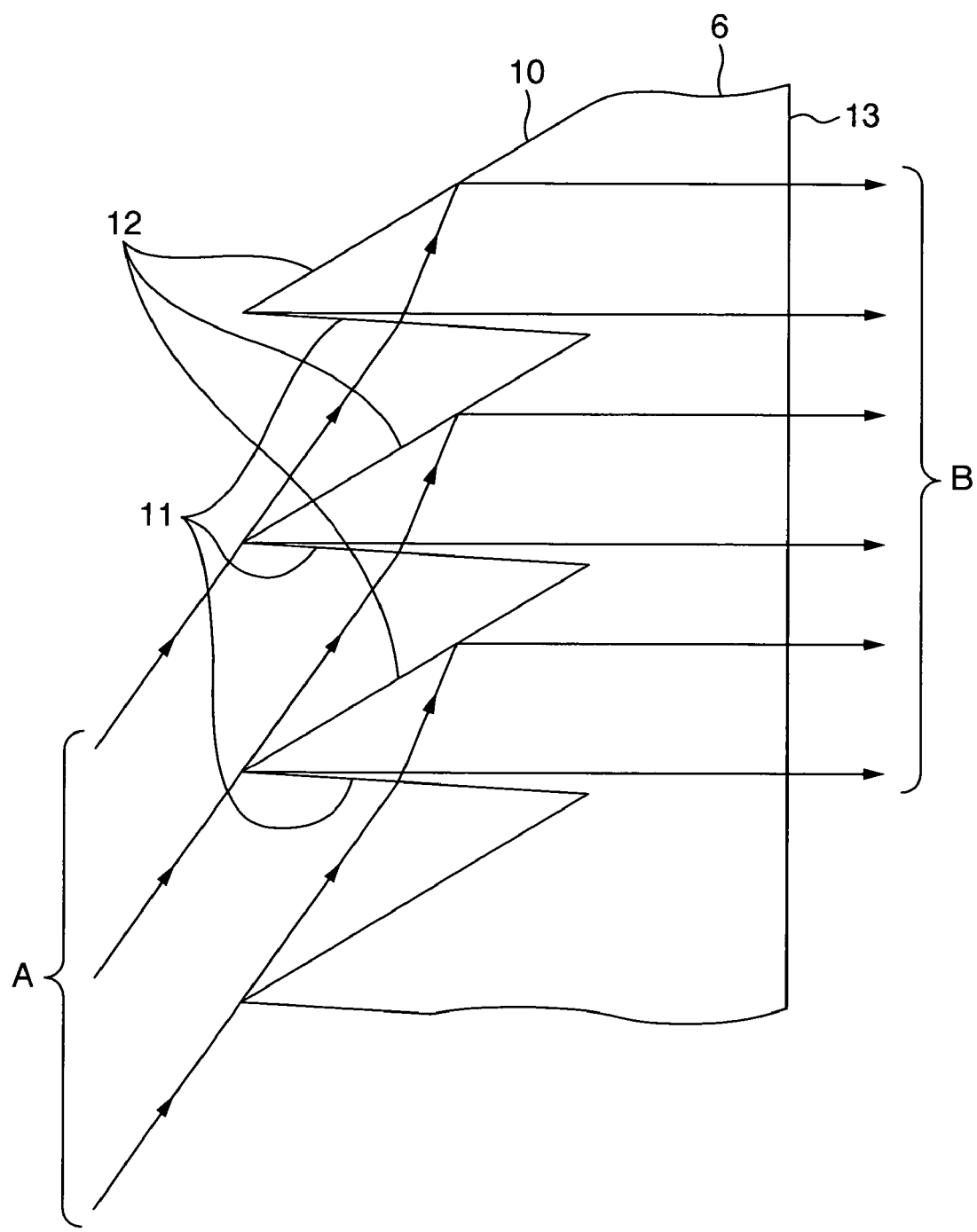
FIG. 3 is a view showing ray tracing in the case where rays of light are incident on a total reflection prism portion at an incident angle of 55 degrees.

The embodiment will be described with reference to FIGS. 3 to 7 in detail. FIG. 3 is a view showing ray tracing in the case where rays of light are incident on the total reflection prism portion 10, which is provided on an incident surface of the Fresnel lens sheet 6, at an incident angle of 55 degrees. That is, FIG. 3 shows the structure of the first total reflection prism portion. A bundle of rays A obliquely incident from under is incident from incident surfaces 11 of the total reflection prism portion 10 to be totally reflected by total reflection surfaces 12 to outgo as a bundle of rays B from an outgoing surface 13 of the Fresnel lens sheet 6. In the case where a material forming the Fresnel lens sheet 6 has a refractive index of around 1.55, the relationship is established provided that a ray incident angle is around 46 degrees or more. However, the following problem is caused when the ray incident angle becomes less than 46 degrees.

Figure 4:
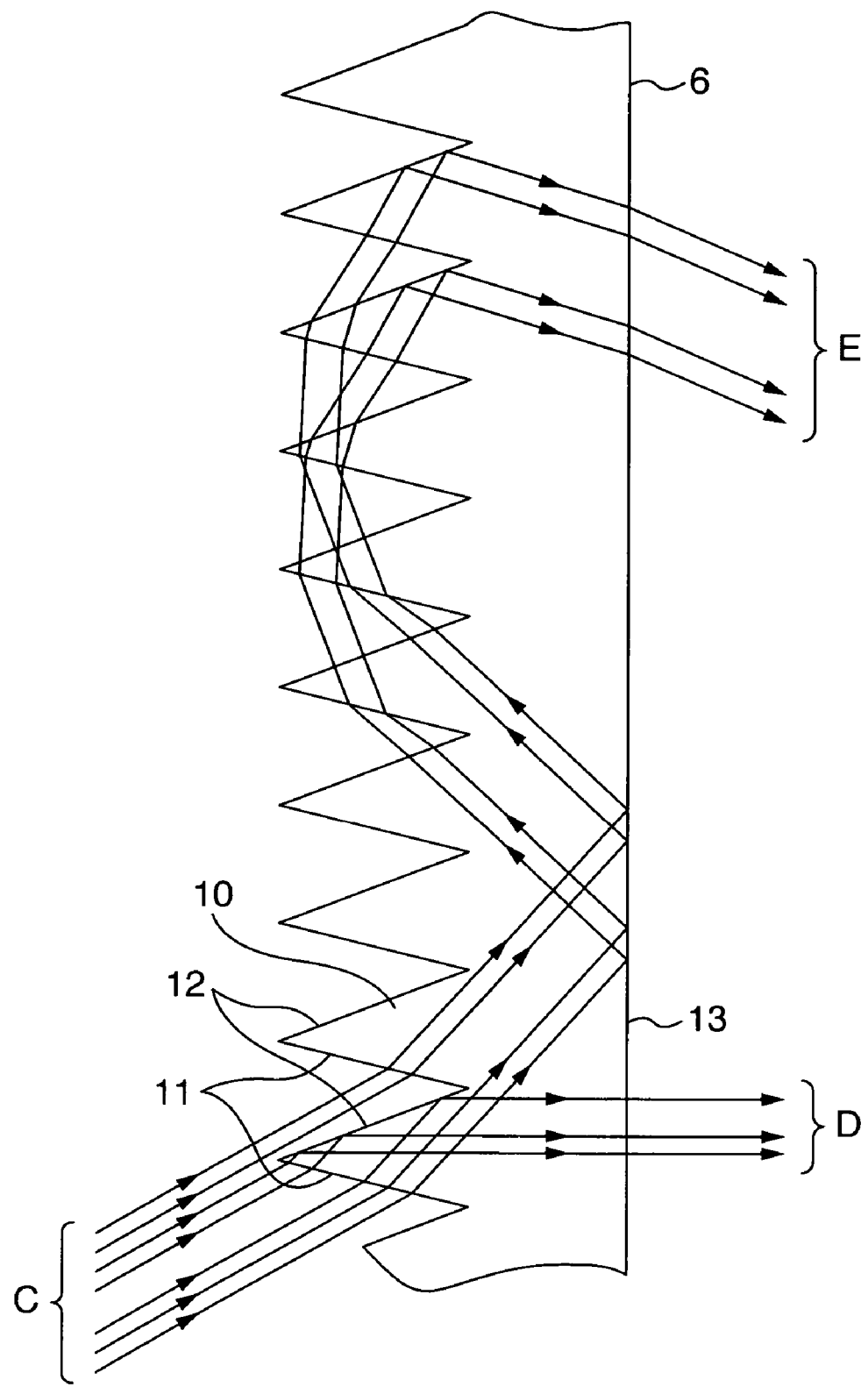
FIG. 4 is a view showing a mechanism, in which stray light is generated.

FIG. 4 is a view showing ray tracing in the case where rays of light are incident on the total reflection prism portion 10, which is provided on the incident surface of the Fresnel lens sheet 6, at an incident angle of less than 46 degrees. A bundle of rays C obliquely incident from under is incident from the incident surfaces 11 of the total reflection prism portion 10, and a major part of the bundle of rays is totally reflected by the total reflection surfaces 12 to outgo as a bundle of rays D from the outgoing surface 13 of the Fresnel lens sheet 6. When the ray incident angle is less than 46 degrees, however, a part of the incident rays of light cannot be totally reflected by the total reflection surfaces 12 and becomes a bundle of rays directly directed toward the outgoing surface 13. The bundle of rays is totally reflected by the outgoing surface 13 to return again to the total reflection prism portion, which is formed by the incident surfaces 11 and the total reflection surfaces 12. Since the total reflection prism portion comprises triangular prisms composed of the incident surfaces 11 and the total reflection surfaces 12, the bundle of rays makes a U-turn as shown in the figure to be directed toward the outgoing surface 13. The bundle of rays is again incident on the outgoing surface 13 at a smaller angle than a total reflection angle this time. The rays of light again incident on the outgoing surface 13 outgo as stray light E from the Fresnel lens sheet 6. The stray light E is responsible for degradation in image quality since it not only deteriorates transmission efficiency of the Fresnel lens sheet 6 by C/A but also appears as a double image on an observer's side.

Figure 5:
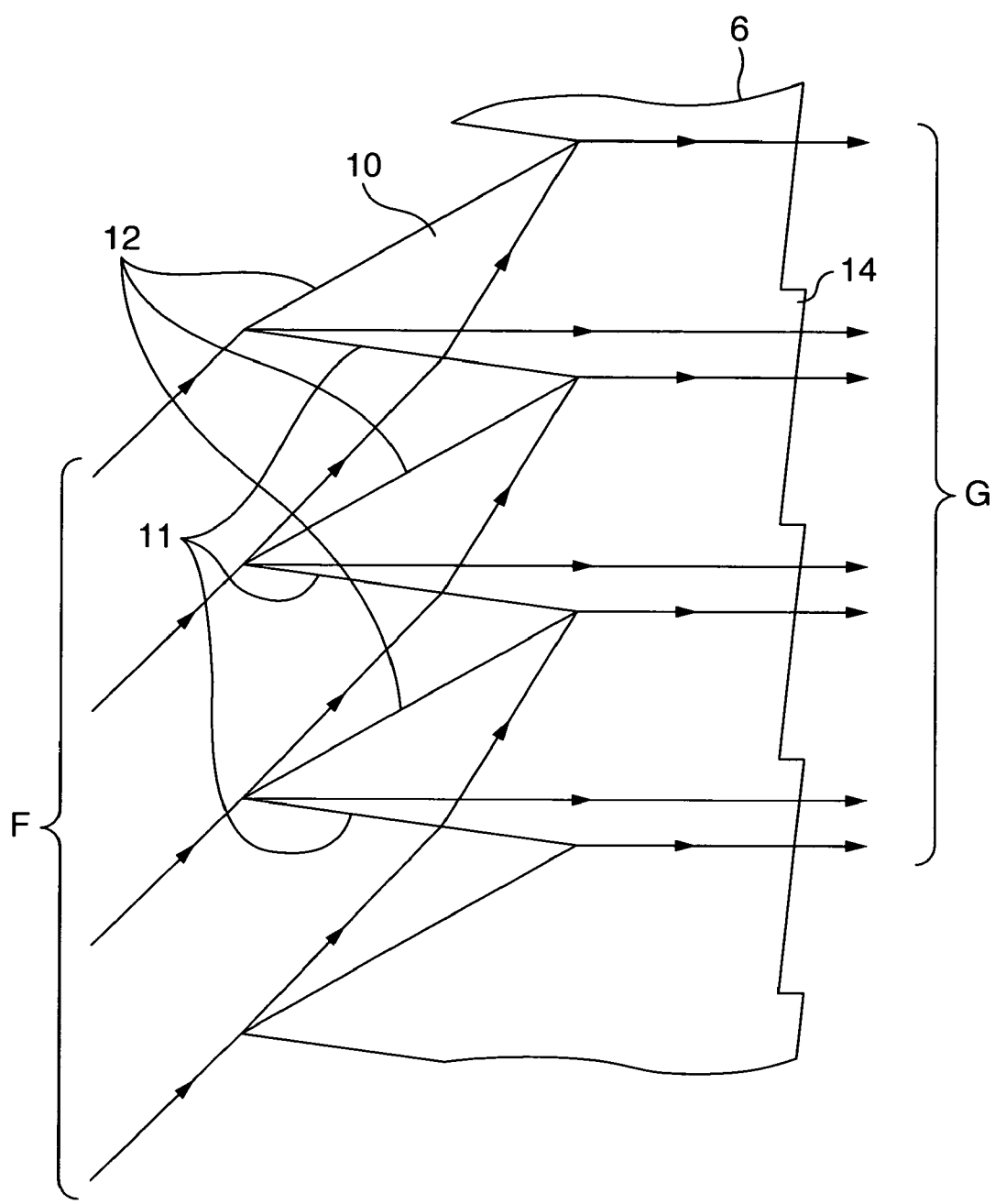
FIG. 5 is a view showing ray tracing in the case where rays of light are incident on the total reflection prism portion at an incident angle of 45 degrees.

FIG. 5 is a view showing ray tracing in the case where rays of light are incident on the total reflection prism portion 10, which is provided on the incident surface of the Fresnel lens sheet 6 according to the embodiment, at an incident angle of 45 degrees. That is, FIG. 5 shows the structure of the second total reflection prism portion and the second refractive prism portion. A bundle of rays F obliquely incident from under is incident from the incident surfaces 11 of the total reflection prism portion 10 to be totally reflected by the total reflection surfaces 12 to outgo as a bundle of rays G from the outgoing surface of the Fresnel lens sheet 6. As described above, in the case where a material forming the Fresnel lens sheet 6 has a refractive index of around 1.55, a stray light illustrated in FIG. 4 is generated unless a ray incident angle is equal to or more than 46 degrees. However, a stray light illustrated in FIG. 4 is not generated provided that rays of light totally reflected by the total reflection surfaces 12 of the second total reflection prism portion as shown in FIG. 5 form a bundle of rays, which is directed not in the first direction substantially perpendicular to the Fresnel lens sheet 6 but in the second direction (downward in FIG. 5), which is directed toward the optic axial center of the Fresnel lens sheet 6. In this case, it is required that a second refractive prism portion 14, by which rays of light in the second direction are caused to outgo in the first direction due to a third refractive phenomenon, be provided on the outgoing surface of the Fresnel lens sheet 6. The smaller a ray incident angle on the Fresnel lens sheet 6, the larger a prism angle of the second refractive prism portion 14.

Figure 6:
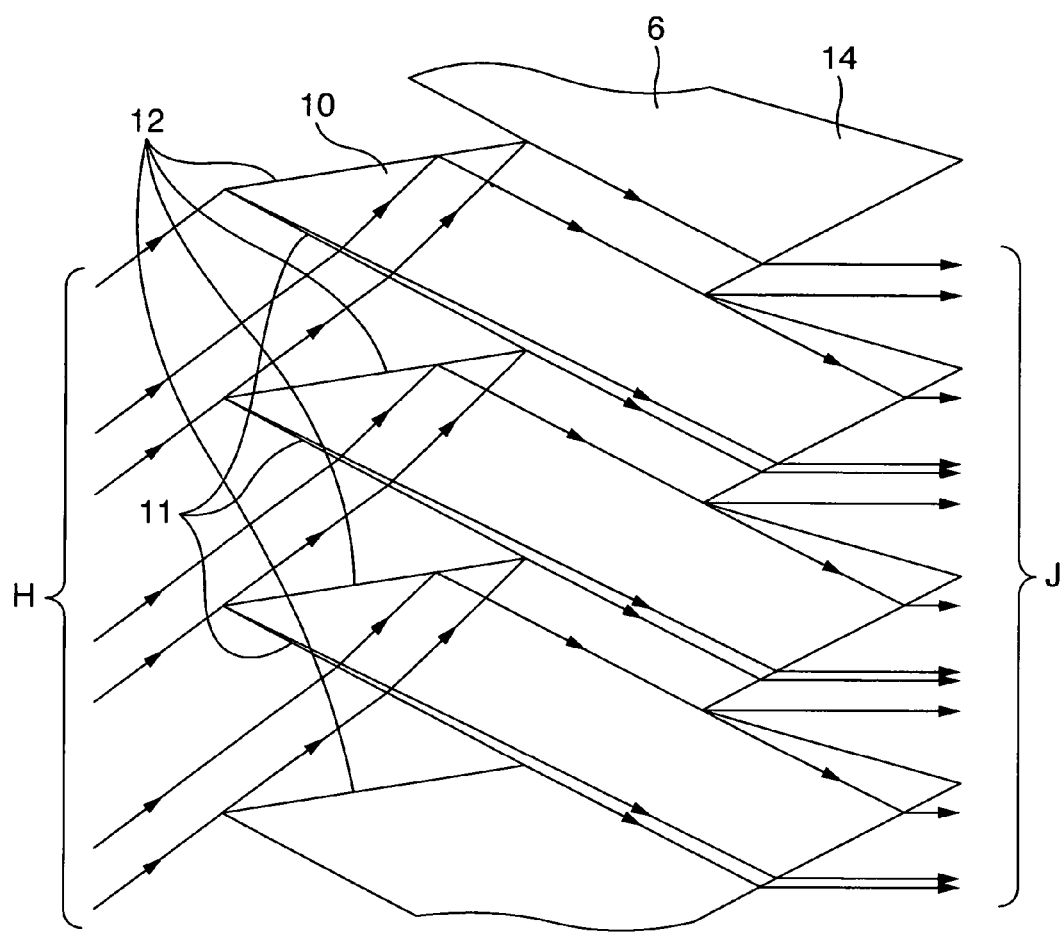
FIG. 6 is a view showing ray tracing in the case where rays of light are incident on the total reflection prism portion at an incident angle of 37 degrees.

FIG. 6 is a view showing ray tracing in the case where rays of light are incident on the total reflection prism portion 10, which is provided on the incident surface of the Fresnel lens sheet 6 according to the embodiment, at an incident angle of 37 degrees. That is, FIG. 6 also shows the structure of the second total reflection prism portion and the second refractive prism portion. A bundle of rays H obliquely incident from under is incident from the incident surfaces 11 of the total reflection prism portion 10 to be totally reflected by the total reflection surfaces 12 to outgo as a bundle of rays J from the outgoing surface of the Fresnel lens sheet 6. At this time, the second refractive prism portion 14, by which rays of light totally reflected by the total reflection surfaces 12 of the second total reflection prism portion to be directed in the second direction are changed into rays of light in the first direction, must have a larger prism angle as compared with the case where an incident angle in FIG. 5 is 45 degrees.

Figure 7A:
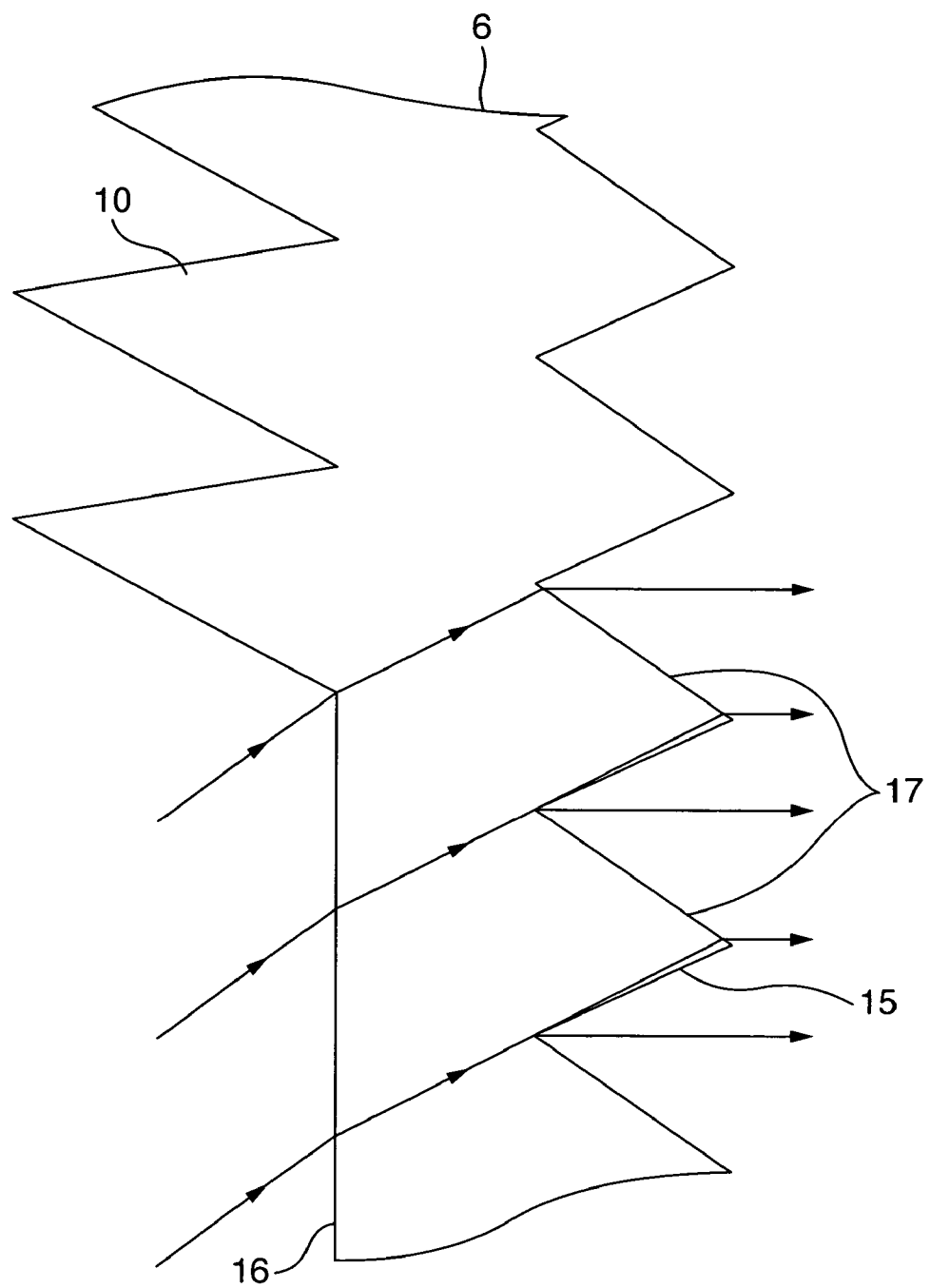
FIG. 7a is a view showing ray tracing for refractive prism portion.
Figure 7B:
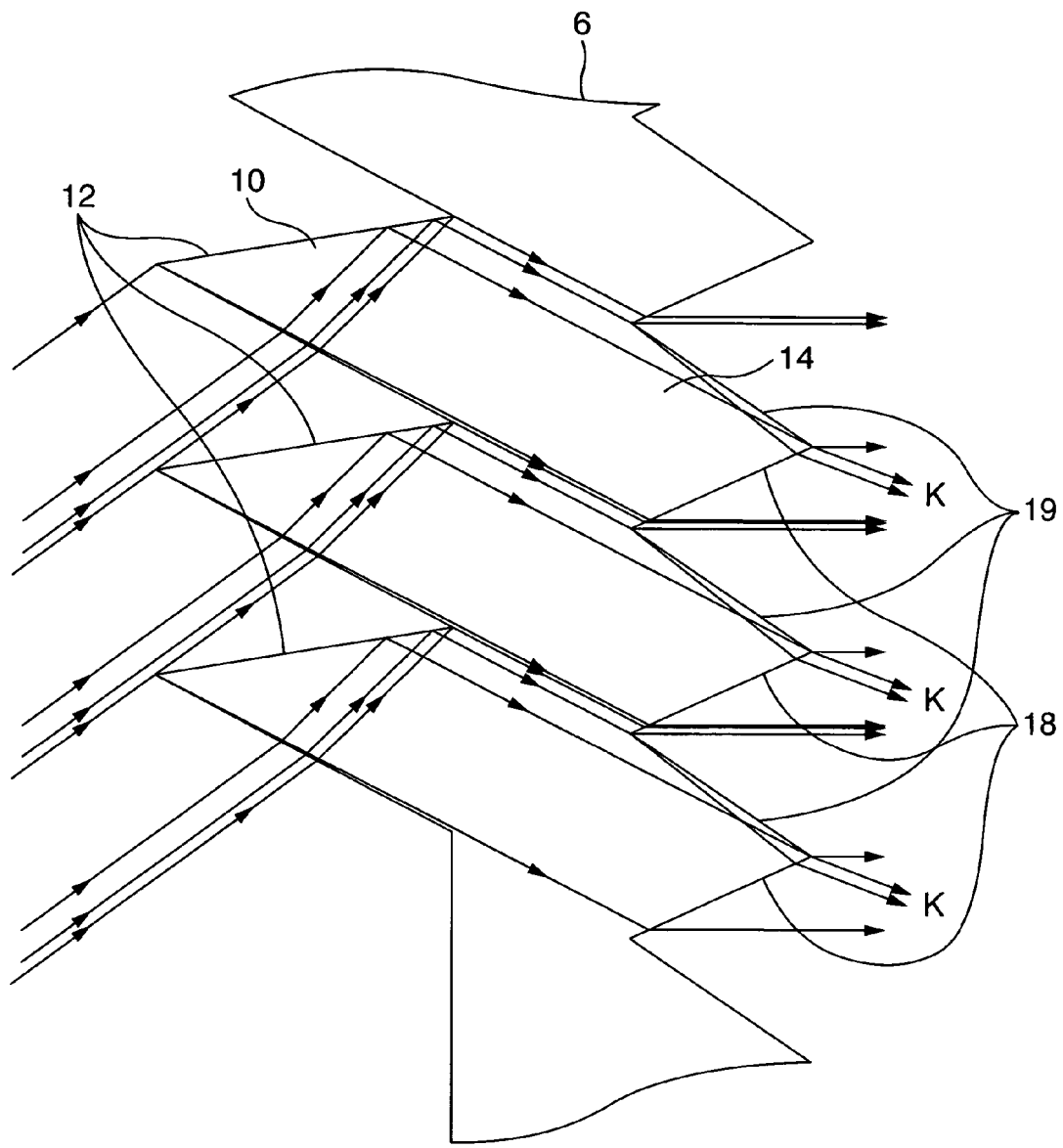
FIG. 7b is a view showing ray tracing for total reflection prism portion.
Figure 7C:
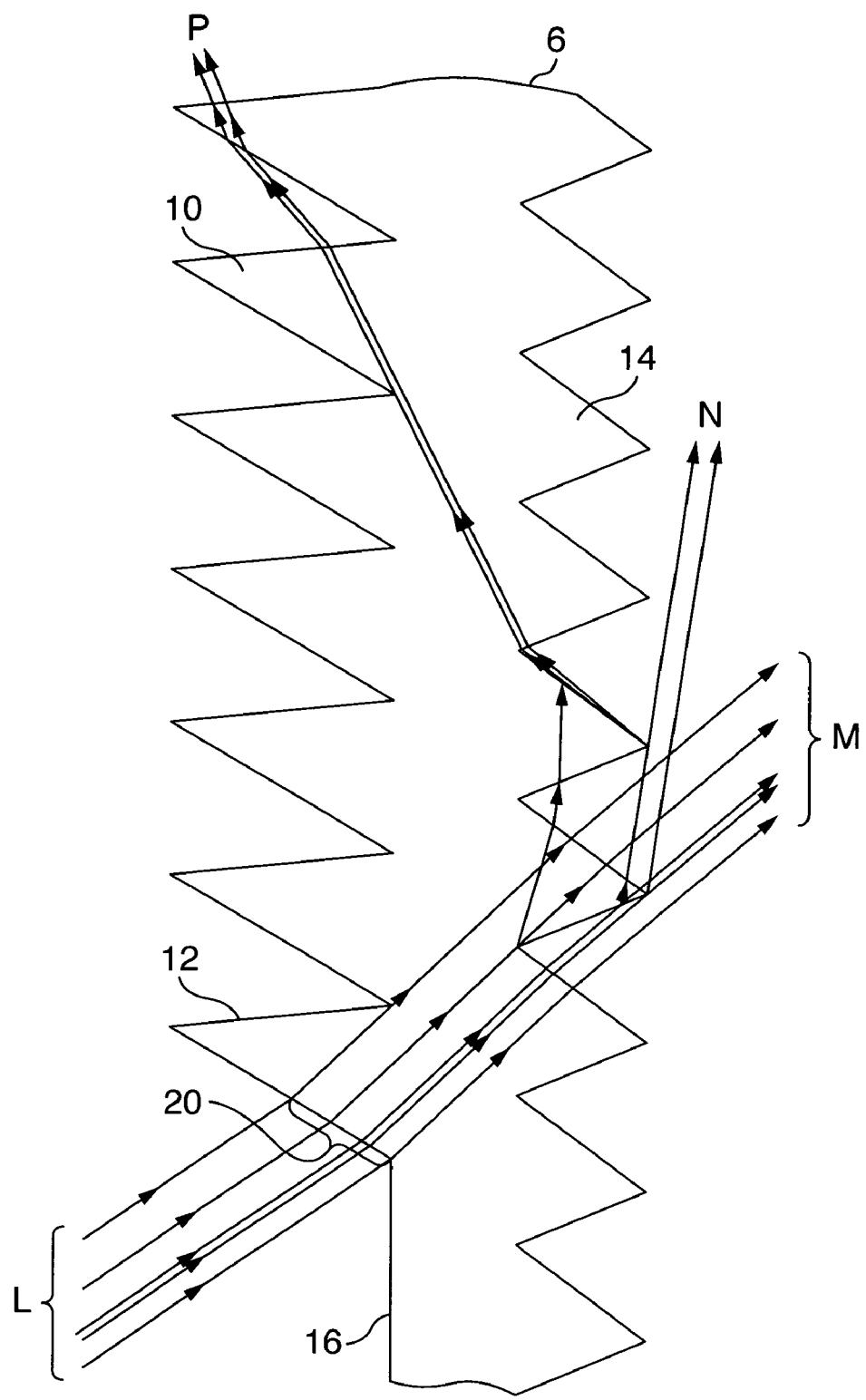
FIG. 7c is a view showing ray tracing in a connecting region between the refractive prism portion shown in FIG. 7a and the total reflection prism portion shown in FIG. 7b.

FIGS. 7a to 7c are views showing ray tracing in the case where rays of light are incident on a boundary of the total reflection prism portion 10 and first refractive prism portion 15 according to the embodiment at an incident angle of 36 degrees. FIGS. 7a to 7c are shown separately for the purpose of simplification of explanation, and operations shown in FIGS. 7a to 7c are performed simultaneously. FIG. 7a is a view showing ray tracing for the first refractive prism portion. An image light incident from a flat surface portion 16 of the incident surface of the Fresnel lens sheet 6 outgoes from outgoing surfaces 17 of the first refractive prism portion 15 to the first direction substantially perpendicular to the Fresnel lens sheet 6. FIG. 7b is almost the same as the view of FIG. 6 showing ray tracing in the case where rays of light are incident on the total reflection prism portion 10 at an incident angle of 37 degrees. In FIG. 7b, the second refractive prism portion 14 has a further large prism angle since the incident angle is changed to 37 degrees from 36 degrees. At this time, the first refractive prism portion 15 in FIG. 7a and the second refractive prism portion 14 in FIG. 7b are the same and structured such that two upper and lower surfaces of the prism portion, respectively, act as separate refractive prisms. Accordingly, angles of the two surfaces of the refractive prism portion are determined univocally. Therefore, a part of rays of light totally reflected by the total reflection surfaces 12 of the total reflection prism portion 10 strikes on connecting surfaces 19 (the same surfaces as the outgoing surfaces 17 of the first refractive prism portion 15 in FIG. 7a) connecting outgoing surfaces 18 of the second refractive prism portion 14 in FIG. 7b, and is totally reflected by the connecting surfaces 19 to outgo as a stray light K downward from the outgoing surfaces 18. While the stray light K causes degradation in image quality, it is small in quantity and not generated at an incident angle of 37 degrees in FIG. 6, so that it does not cause a problem especially. FIG. 7c is a view showing ray tracing in a connecting region between the first refractive prism portion shown in FIG. 7a and the total reflection prism portion shown in FIG. 7b. Since a bundle of rays L incident from a connecting portion 20 between the total reflection prism portion 10 and the flat surface portion 16 is not incident on the total reflection surfaces 12 of the total reflection prism portion 10, it is incident directly on the second refractive prism portion 14 to make stray lights M, N, P. Since the stray lights are small in quantity, they do not cause degradation in image quality. A region of the boundary (regions, in which the refractive prism portion and the total reflection prism portion overlap or approach each other in a direction substantially perpendicular to the Fresnel lens sheet 6) of the refractive prism portion and the total reflection prism portion, shown in FIGS. 7a to 7c, of the Fresnel lens sheet 6 according to the embodiment, are determined by the manufacturing technology of Fresnel lens sheet. That is, in the case where the incident surface and the outgoing surface of the Fresnel lens sheet 6 can be positioned very accurately, the region of connection can be made small, but in the case where positioning is not good in accuracy, the region of connection must be made large. Even when the region of connection is made large, however, an area, in which the stray light K in FIG. 7b is generated, is a little increased, which does not cause an important problem.

With the Fresnel lens sheet 6, according to the invention, illustrated in FIGS. 3 to 7, the refractive prism portion and the total reflection prism portion can be connected together with generation of little stray light. Even in the case where positioning of the incident surface and the outgoing surface of the Fresnel lens sheet is not good in accuracy, it is possible to restrain generation of stray light to a minimum.

Figure 8:
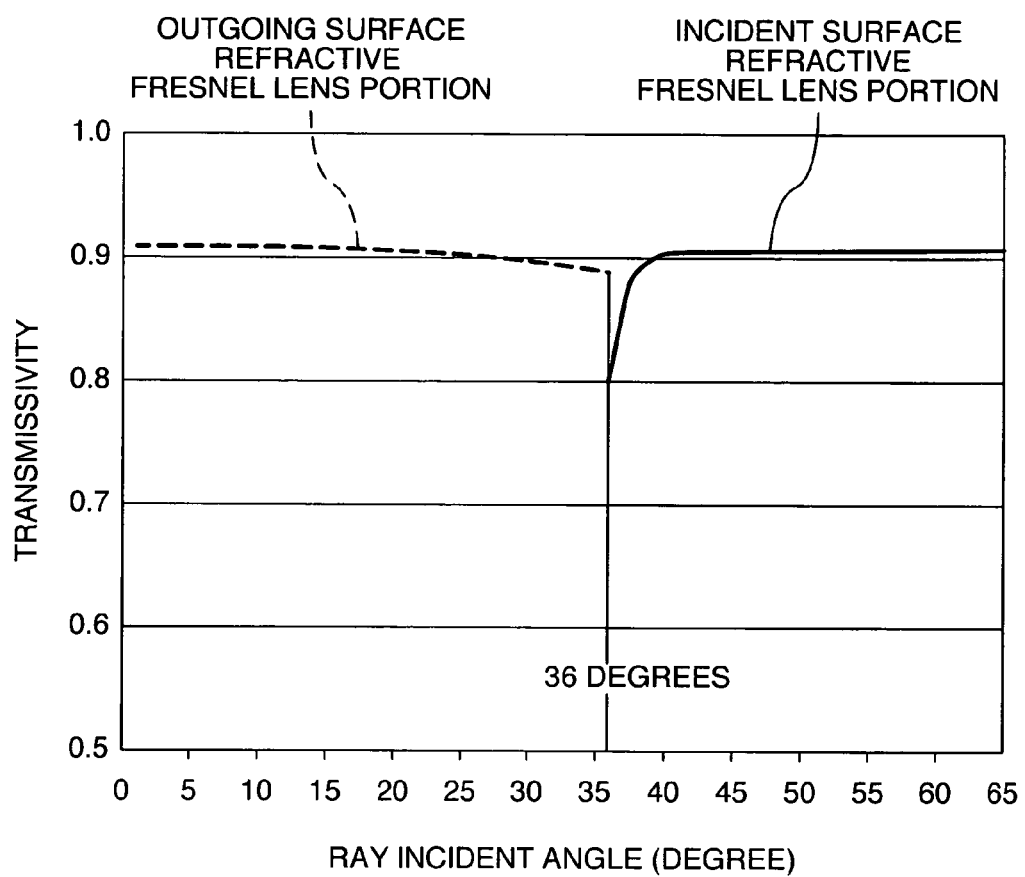
FIG. 8 is a graph showing transmissivity of an embodiment of a Fresnel lens sheet according to the invention.

FIG. 8 is a graph showing the transmissivity of the Fresnel lens sheet 6, according to the invention, illustrated in FIGS. 7a to 7c. In the figure, an axis of abscissa indicates an angle, at which rays of light are incident on the Fresnel lens sheet 6, and a broken line indicates the transmissivity of total reflection prism portion (referred to as outgoing surface total reflection Fresnel lens portion in FIG. 9). A solid line indicates the transmissivity of refractive prism portion (referred to as outgoing surface refractive Fresnel lens portion in FIG. 9). While a boundary of the refractive prism portion and the total reflection prism portion is 36 degrees, the transmissivity of incident surface total reflection Fresnel lens portion is extremely decreased and discontinuity is generated in luminance. Since a difference in luminance is as small as around 10% and an area, in which the stray light is generated, is in a small range, an important problem is not caused but it is desired that such point of discontinuity does not exist.

Figure 9:
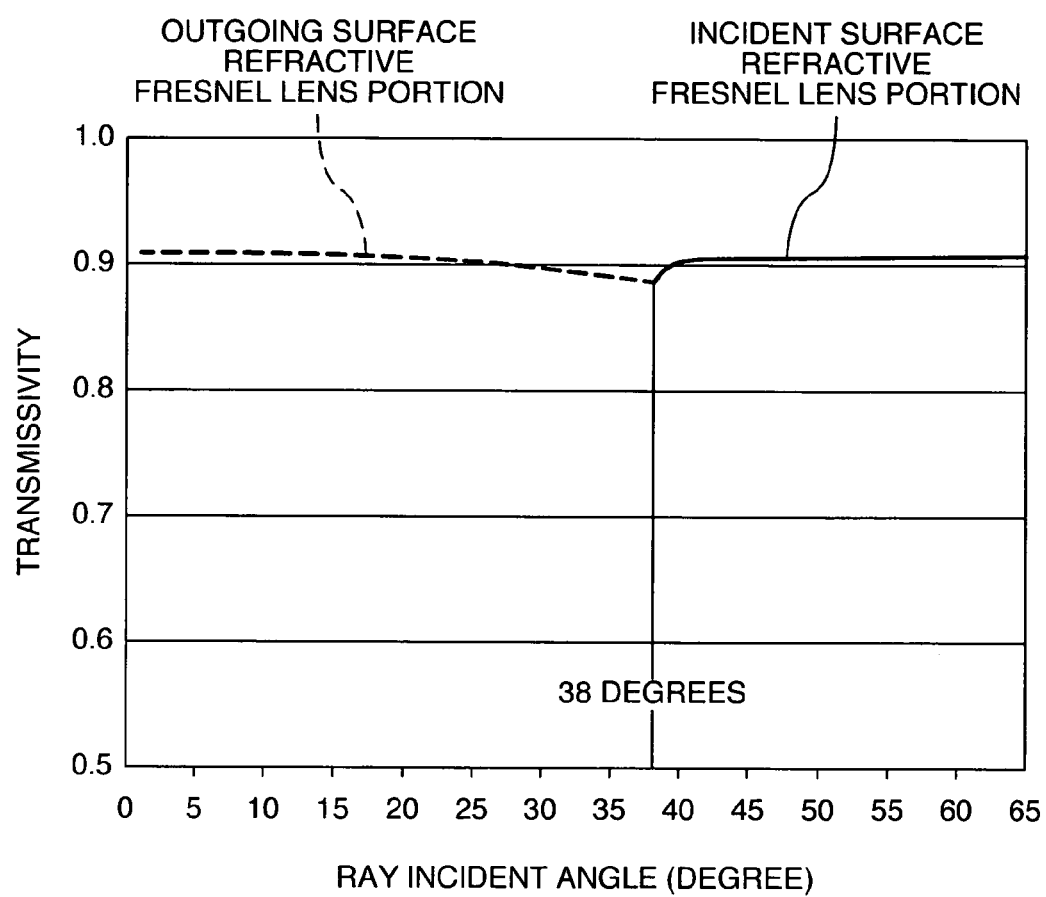
FIG. 9 is a graph showing transmissivity of another embodiment of the Fresnel lens sheet according to the invention.

FIG. 9 is a view showing the transmissivity of a Fresnel lens sheet 6, according to a further embodiment of the invention, in the case where a point of connection of the refractive prism portion and the total reflection prism portion is 38 degrees. In this case, a difference in luminance is as small as around 3% and no problem is caused in terms of transmissivity.

Figure 10:
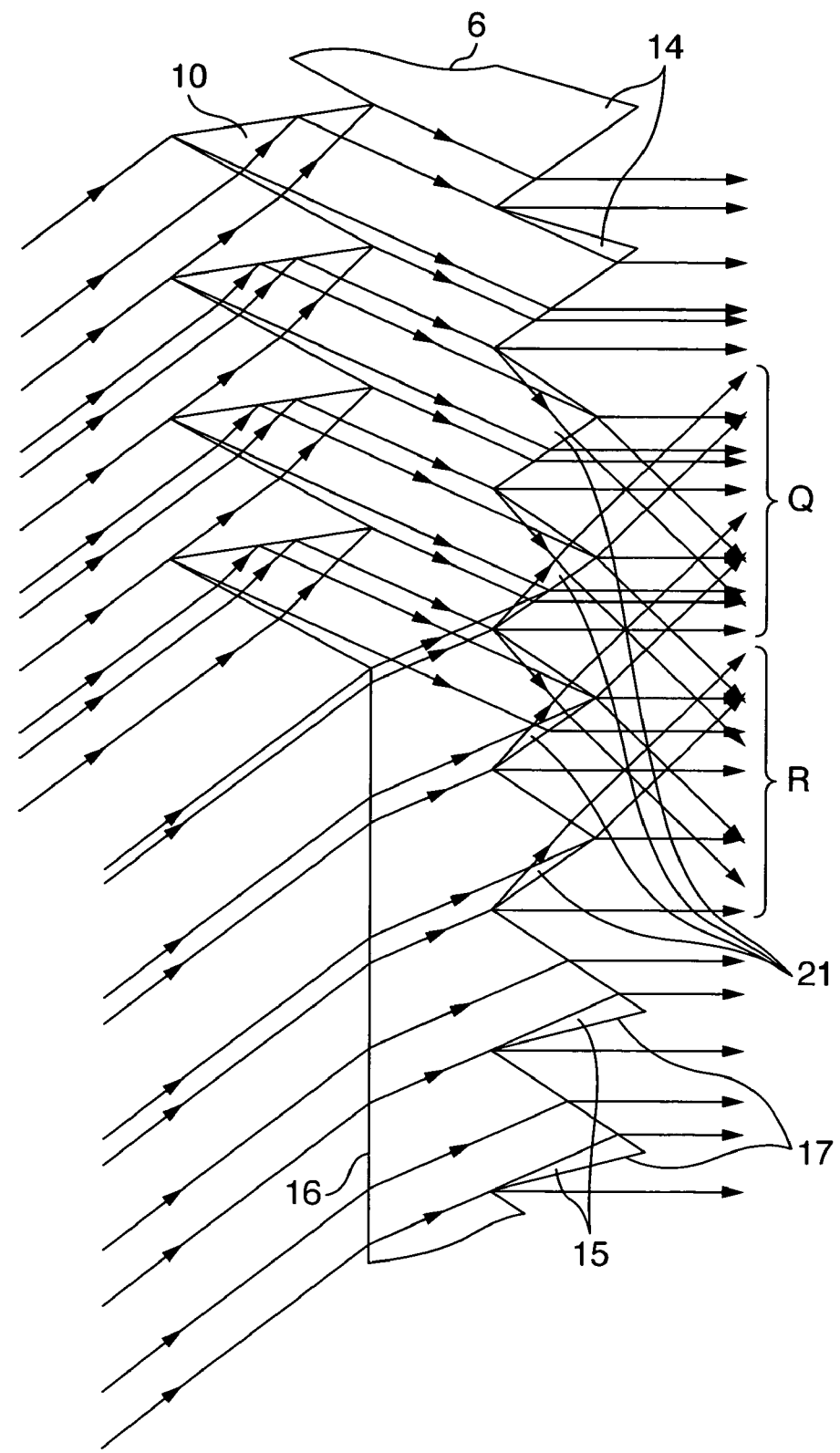
FIG. 10 is a view showing ray tracing in the case where a ray incident angle at a boundary of a refractive prism portion and a total reflection prism portion is 38 degrees, and showing a still embodiment of the invention.

FIG. 10 shows a further embodiment of the invention in the case where a boundary of the refractive prism portion and the total reflection prism portion is 38 degrees, and is a view showing ray tracing in the case where rays of light are incident on the boundary at an incident angle of 38 degrees. In the embodiment shown in FIGS. 7a to 7c, the second refractive prism portion 14, through which rays of light totally reflected by the total reflection prism portion 10 are transmitted, and the first refractive prism portion 15, through which rays of light incident from the flat surface portion 16 are transmitted, are the same in shape (different in surfaces, through which rays of light are transmitted). On the other hand, in the embodiment shown in FIG. 10, the second refractive prism portion 14, through which rays of light totally reflected by the total reflection prism portion 10 are transmitted, and the first refractive prism portion 15, through which rays of light incident from the flat surface portion 16 are transmitted, are different in shape from each other, and a third refractive prism portion 21 is further provided between the both prism portions. A prism angle of the third refractive prism portion 21 is substantially the same as a prism angle of surfaces of the second refractive prism portion 14, through which rays of light are transmitted, and as a prism angle of surfaces of the first refractive prism portion 15, through which rays of light are transmitted.

Ray tracing for the refractive prism portion is the same as that described above. That is, an image light incident from the flat surface portion 16 outgoes from outgoing surfaces 17 of the first refractive prism portion 15 to a direction substantially perpendicular to the Fresnel lens sheet 6. Also, ray tracing for the total reflection prism portion is almost the same as that illustrated in FIG. 6 (that is, a view showing ray tracing in the case where rays of light are incident on the total reflection prism portion 10 at an incident angle of 37 degrees). The third refractive prism portion 21 is provided between the refractive prism portion and the total reflection prism portion, and rays of light are incident on the both. When rays of light incident from the flat surface portion 16 are incident on the third refractive prism portion 21, a stray light Q in addition to a normal image light is generated to be substantially perpendicular to the Fresnel lens sheet 6. When rays of light incident from the total reflection prism portion 10 are incident on the third refractive prism portion 21, a stray light R in addition to a normal image light is generated to be substantially perpendicular to the Fresnel lens sheet 6. The stray light Q and the stray light R make double images to cause degradation in image quality. However, a region, in which the third refractive prism portion 21 is provided, is positioned in a limited area of the boundary between the refractive prism portion and the total reflection prism portion, and is in a level free of a problem.

In the case where the Fresnel lens sheet 6 according to the embodiment is to be manufactured by molding with the use of a metal mold, the total reflection prism portion is, in some cases, greatly degraded in transmissivity. The reason for this is that when surfaces of a metal mold are rough, total reflection is not performed completely and a part of rays of light transmits through a total reflection surface. In such case, it is preferable that the boundary between the refractive prism portion and the total reflection prism portion be set in a further high position.

Figure 11:
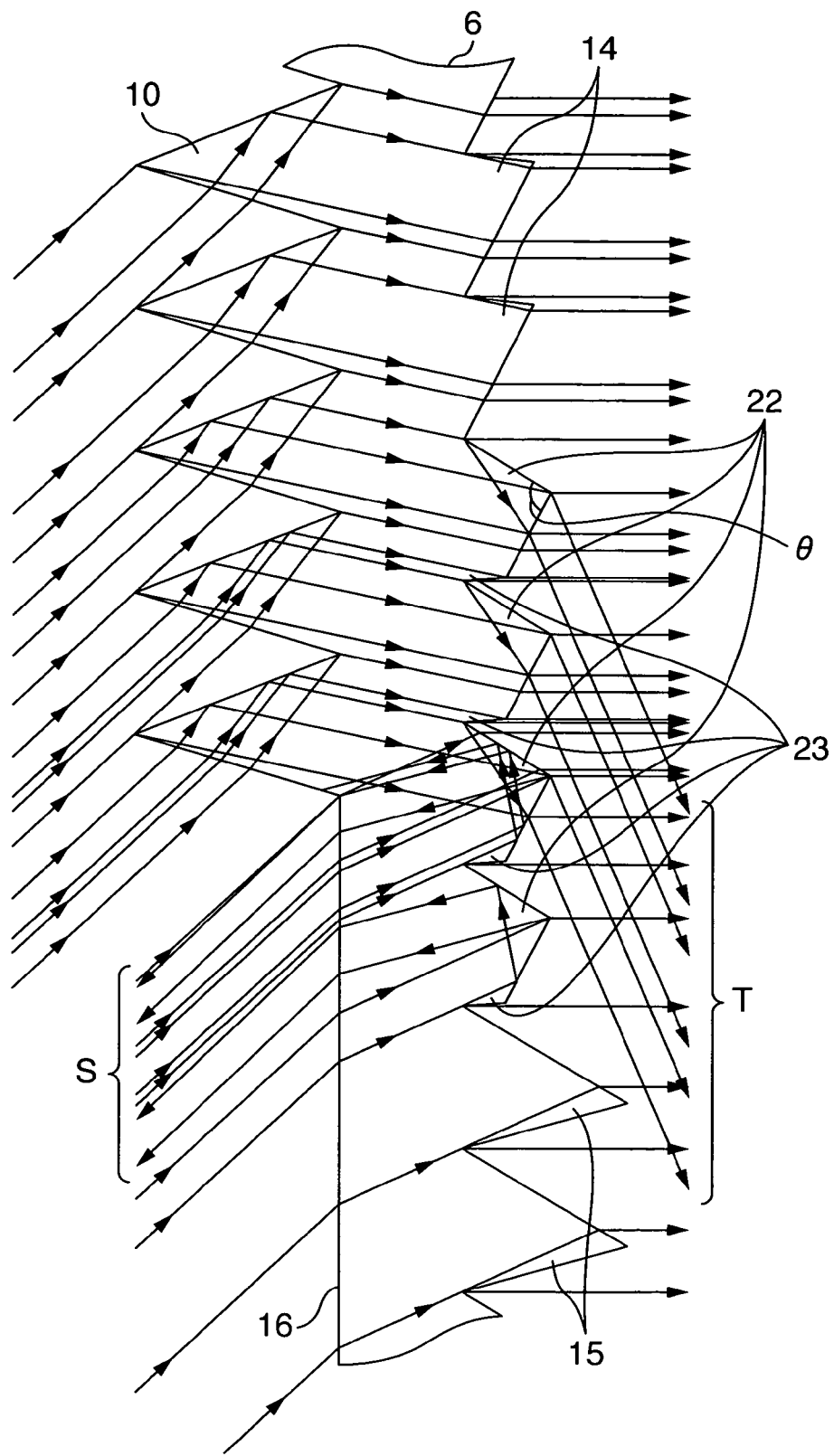
FIG. 11 is a view showing ray tracing in the case where a ray incident angle at a boundary of the refractive prism portion and the total reflection prism portion is 42 degrees, and showing a still further embodiment of the invention.
Figure 12:
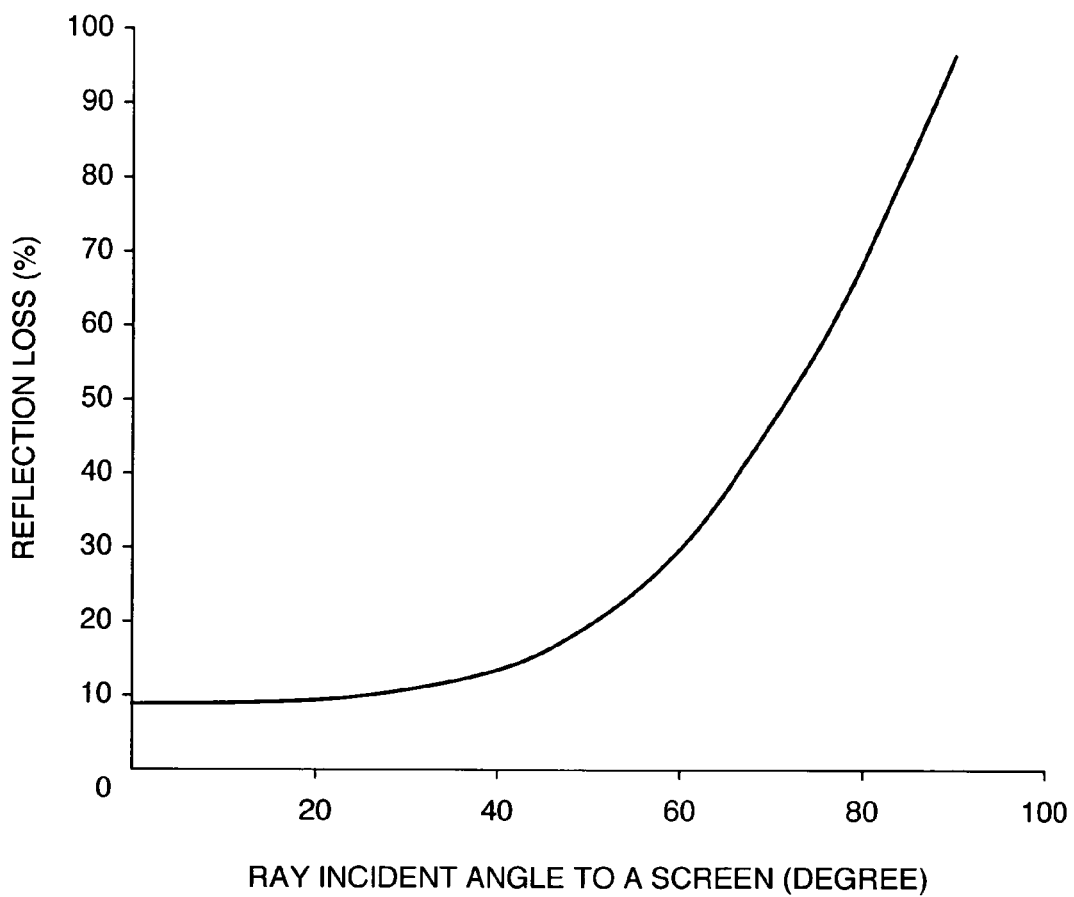
FIG. 12 is a graph illustrating relationship between a ray incident angle on a typical outgoing surface Fresnel lens sheet relative to a screen and reflection loss.

FIG. 11 shows a further embodiment of the invention in the case where a ray incident angle at a boundary of the refractive prism portion and the total reflection prism portion is 42 degrees, and is a view showing ray tracing in the case where rays of light are incident on the boundary at an incident angle of 42 degrees. An optical path in the embodiment is almost the same as that illustrated in FIG. 10. However, the embodiment is different from that of FIG. 10 in shape of the third refractive prism portion 22 provided between the second refractive prism portion 14, through which rays of light totally reflected by total reflection prism portion 10 are transmitted, and the first refractive prism portion 15, through which rays of light incident from the flat surface portion 16 are transmitted. A prism angle of the third refractive prism portion 22 is the same as that of the embodiment shown in FIG. 10 in being composed of a prism angle of surfaces of the second refractive prism portion 14, through which rays of light are transmitted, and a prism angle of surfaces of the first refractive prism portion 15, through which rays of light are transmitted. However, differences 23 in level are generated since the prism angle of surfaces of the second refractive prism portion 14, through which rays of light are transmitted, is small as compared with that in the embodiment shown in FIG. 10. Also, since an apex angle θ of the third refractive prism portion 22 is around 90 degrees for the same reason, rays of light incident at an angle close to a total reflection angle repeat total reflection on two prism surfaces to return roughly in a direction along an original way. Since those rays of light out of rays of light incident from the flat surface portion 16, which are incident on lower sides of the third refractive prism portion 22, correspond to the rays of light described above and return as the stray light S to the picture source, there is a feature that degradation in image quality is not resulted. The reason why rays of light incident from the total reflection prism portion 10 are incident on the third refractive prism portion 22 and a stray light T in addition to a normal image light is generated to be substantially perpendicular to the Fresnel lens sheet 6 is the same as that for the embodiment illustrated in FIG. 10. In the present embodiment, a quantity of stray light responsible for degradation in image quality is a half of that of the embodiment illustrated in FIG. 10, so that it is possible to make the grade in image quality higher than that of the embodiment illustrated in FIG. 10.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A screen having a Fresnel lens sheet, on which light from a picture source is projected, the screen comprising:
   a first total reflection prism portion, which is provided on a side of the Fresnel lens sheet toward the picture source and by which light incident at a first incident angle range is reflected to a first direction substantially perpendicular to the Fresnel lens sheet to outgo;
   a second total reflection prism portion, which is provided on the side of the Fresnel lens sheet toward the picture source and by which light incident at a second incident angle range smaller than the first incident angle range is reflected to a second direction toward an optic axial center of the Fresnel lens sheet to outgo;
   a first refractive prism portion, which is provided on a picture seen side of the Fresnel lens sheet and by which at least light of a smaller incident angle than the second incident angle range is refracted to outgo to the first direction; and
   a second refractive prism portion, which is provided on the picture seen side of the Fresnel lens sheet and by which light outgoing from the second total reflection prism portion to be directed to the second direction is refracted to outgo to the first direction.

2. A screen according to claim 1, wherein a diffusion sheet is arranged on the picture seen side of the Fresnel lens sheet to diffuse an image light at least in a horizontal direction on a screen plane.

3. A screen having a Fresnel lens sheet, on which light from a picture source is projected, the Fresnel lens sheet comprising:
   a total reflection prism portion formed on a side of the Fresnel lens sheet toward the picture source; and
   a refractive prism portion formed on a picture seen side of the Fresnel lens; and
   wherein the total reflection prism portion includes a first total reflection prism portion, which is formed in that region on the side of the Fresnel lens sheet toward the picture source, on which the light is incident at a predetermined incident angle or more, and by which at least the light is reflected to a first direction substantially perpendicular to the Fresnel lens sheet to outgo, and
   a second total reflection prism portion, by which the light is reflected to a second direction toward an optic axial center of the Fresnel lens sheet to outgo, and
   the refractive prism portion includes a first refractive prism portion having a first refractive surface, which is formed in a region disposed on the picture seen side of the Fresnel lens sheet and opposed to that region, in which at least the total reflection prism portion is not formed, and by which the light is refracted to outgo toward the picture seen side, and
   a second refractive prism portion having a second refractive surface, by which light outgoing from the second total reflection prism portion to be directed to the second direction is refracted to the first direction to outgo.

4. A screen according to claim 3, wherein the first refractive prism portion and the second refractive prism portion are provided adjacent to each other, and a prism angle of at least one surface, which is different from the second refractive surface of the second refractive prism portion and disposed in a predetermined region, is made substantially the same as a prism angle of the first refractive prism portion adjacent to the second refractive prism portion.

5. A screen according to claim 4, wherein that region on the side of the Fresnel lens sheet toward the picture source, on which the light is incident at less than a predetermined incident angle, defines a flat portion, and the predetermined region is one opposed to a region covering a boundary of the total reflection prism portion and the flat portion.

6. A screen having a Fresnel lens sheet, on which light from a picture source is projected, the Fresnel lens sheet comprising:

a total reflection prism formed on a side of the Fresnel lens sheet toward the picture source; and a first refractive prism portion formed on a picture seen side of the Fresnel lens sheet; and wherein the total reflection prism portion is formed in that region on the side of the Fresnel lens sheet toward the picture source, on which the light is incident at a predetermined incident angle or more, the first refractive prism portion includes a first refractive surface, which is formed in a region disposed on the picture seen side of the Fresnel lens sheet and opposed to that region, in which the total reflection prism portion is not formed, and by which the light is refracted to outgo toward the picture seen side, the total reflection prism portion includes a first total reflection prism portion, by which at least the light is reflected to a first direction substantially perpendicular to the Fresnel lens sheet to outgo, and a second total reflection prism portion, by which the light is reflected to a second direction toward an optic axial center of the Fresnel lens sheet to outgo, a second refractive prism portion is provided on the picture seen side of the Fresnel lens sheet to include a second refractive surface, by which light outgoing from the second total reflection prism portion to be directed to the second direction is refracted to the first direction to outgo, and a third refractive prism portion is provided between the second refractive prism portion and the first refractive prism portion to include at least a surface having substantially the same prism angle as that of the second refractive prism portion and a surface having substantially the same prism angle as that of the first refractive prism portion.

7. A screen according to claim 6, wherein that region on the side of the Fresnel lens sheet toward the picture source, on which the light is incident at less than a predetermined incident angle, defines a flat portion, and the third refractive prism portion is provided in a region opposed to a region covering a boundary of the total reflection prism portion and the flat portion.

8. A image display apparatus comprising:
a picture source;
an optical part that enlarges and projects an image of the picture source;
a transmissive screen, on which a projected image projected from the optical part is thrown; and wherein the transmissive screen comprises a Fresnel lens sheet and a diffusion sheet arranged on a picture seen side of the Fresnel lens sheet to diffuse an image light at least in a horizontal direction on a screen plane, a first total reflection prism portion, by which light incident at a first incident angle range is reflected to a first direction substantially perpendicular to the Fresnel lens sheet to outgo, and a second total reflection prism portion, by which light incident at a second incident angle range smaller than the first incident angle range is reflected to a second direction toward an optic axial center of the Fresnel lens sheet to outgo, are provided on a side of the Fresnel lens sheet toward the picture source, and a first refractive prism portion, by which at least light of a smaller incident angle than the second incident angle range is refracted to outgo in the first direction, and a second refractive prism portion, by which light outgoing from the second total reflection prism portion to be directed in the second direction is refracted in the first direction to outgo, are provided on a picture seen side of the Fresnel lens sheet.

9. A image display apparatus according to claim 8, wherein the first and second refractive prism portions are formed in a region disposed on the picture seen side of the Fresnel lens sheet and opposed to that region, in which at least the total reflection prism portion is not formed.

10. A image display apparatus according to claim 9, wherein the first refractive prism portion and the second refractive prism portion are provided adjacent to each other, and a prism angle of at least one surface out of those surfaces, which are different from the second refractive surface of the second refractive prism portion disposed in a predetermined region, is made substantially the same as a prism angle of the first refractive prism portion adjacent to the second refractive prism portion.

11. A image display apparatus according to claim 10, wherein that region on the side of the Fresnel lens sheet toward the picture source, on which the light is incident at less than a predetermined incident angle, defines a flat portion, and the predetermined region is one opposed to a region covering a boundary of the total reflection prism portion and the flat portion.

12. A image display apparatus according to claim 8, wherein a third refractive prism portion is provided between the second refractive prism portion and the first refractive prism portion to include at least a surface having substantially the same prism angle as that of the second refractive prism portion and a surface having substantially the same prism angle as that of the first refractive prism portion.

13. A image display apparatus according to claim 12, wherein that region on the side of the Fresnel lens sheet toward the picture source, on which the light is incident at less than a predetermined incident angle, defines a flat portion, and the third refractive prism portion is provided in a region opposed to a region covering a boundary of the total reflection prism portion and the flat portion.

* * * * *